(12) United States Patent
Carter et al.

(10) Patent No.: US 6,687,445 B2
(45) Date of Patent: Feb. 3, 2004

(54) DOUBLE-CLAD OPTICAL FIBER FOR LASERS AND AMPLIFIERS

(75) Inventors: Adrian Carter, Bulli (AU); Kanishka Tankala, South Windsor, CT (US); Martin Seifert, West Simsbury, CT (US)

(73) Assignee: Nufern, East Granby, CT (US)

( * ) Notice: Subject to any disclaimer, the term of this patent is extended or adjusted under 35 U.S.C. 154(b) by 102 days.

(21) Appl. No.: 09/888,916

(22) Filed: Jun. 25, 2001

(65) Prior Publication Data

US 2002/0197039 A1 Dec. 26, 2002

(51) Int. Cl.[7] ................................................. G02B 6/02

(52) U.S. Cl. .................................... 385/127; 372/6

(58) Field of Search .......................... 385/127, 123; 372/6

(56) References Cited

U.S. PATENT DOCUMENTS

| | | | |
|---|---|---|---|
| 3,729,690 A | 4/1973 | Snitzer | 372/40 |
| 3,808,549 A | 4/1974 | Maurer | 372/6 |
| 4,173,393 A | 11/1979 | Maurer | 385/142 |
| 4,315,666 A | 2/1982 | Hicks, Jr. | |
| 4,546,476 A | 10/1985 | Shaw et al. | 372/6 |
| 4,701,614 A | 10/1987 | Jaeger et al. | 385/126 |
| 4,709,986 A | 12/1987 | Hicks, Jr. | 385/126 |
| 4,815,079 A | 3/1989 | Snitzer et al. | 372/6 |
| 5,121,460 A | 6/1992 | Tumminelli et al. | 385/126 |
| 5,317,667 A | * 5/1994 | Weber et al. | 385/147 |
| 5,319,652 A | 6/1994 | Moeller et al. | 372/6 |
| 5,349,590 A | 9/1994 | Amirkhanian et al. | 372/6 |
| 5,371,815 A | 12/1994 | Poole | |
| 5,402,966 A | 4/1995 | von Hoessle | |
| 5,418,880 A | 5/1995 | Lewis et al. | 385/123 |
| RE35,020 E | 8/1995 | Quinlan, Jr. | |
| 5,533,163 A | 7/1996 | Muendel | 385/126 |
| 5,756,209 A | 5/1998 | Hale | 428/392 |
| 5,761,234 A | 6/1998 | Craig et al. | 372/75 |
| 5,822,489 A | 10/1998 | Hale | 385/145 |
| 5,864,644 A | 1/1999 | DiGiovanni et al. | |
| 5,864,645 A | 1/1999 | Zellmer et al. | 385/126 |
| 5,873,923 A | 2/1999 | DiGiovanni | 65/390 |
| 5,898,715 A | 4/1999 | LeGrange et al. | 372/6 |
| 5,949,941 A | 9/1999 | DiGiovanni | 385/127 |
| 5,966,491 A | 10/1999 | DiGiovanni | 385/127 |
| 6,031,850 A | 2/2000 | Cheo | 372/6 |
| 6,101,199 A | 8/2000 | Wang et al. | 372/6 |
| 6,115,526 A | 9/2000 | Morse | 385/125 |
| 6,154,595 A | * 11/2000 | Yokogawa et al. | 385/127 |

(List continued on next page.)

FOREIGN PATENT DOCUMENTS

| | | |
|---|---|---|
| EP | 1 043 816 A2 | 11/2000 |
| WO | WO 93/15536 | 8/1993 |
| WO | WO 99/30391 | 6/1999 |

OTHER PUBLICATIONS

U.S. patent application Ser. No. 09/694,549, Tankala et al., filed Oct. 23, 2000.

Primary Examiner—Hung N. Ngo
(74) Attorney, Agent, or Firm—Peter J Rainville

(57) ABSTRACT

A double-clad optical fiber includes a core, a multimode inner cladding layer disposed about the core, and a second cladding layer disposed about the inner cladding layer. The core includes an active material for absorbing pump radiation received by the inner cladding. The multimode inner cladding includes truncated regions including a first material, where the first material has an index of refraction that is different than the material of the inner cladding that surrounds said truncated regions, for promoting the scattering of pump radiation propagating in the multimode inner cladding for increasing the absorption of the pump radiation by the active material of the core. Particles can be distributed in soot deposited via Outside Vapor Deposition for forming the truncated regions in an optical fiber drawn from the preform.

11 Claims, 6 Drawing Sheets

U.S. PATENT DOCUMENTS

| | | | |
|---|---|---|---|
| 6,157,763 A | 12/2000 | Grubb et al. ............... 385/126 |
| 6,192,713 B1 | 2/2001 | Zhang et al. |
| 6,263,003 B1 | 7/2001 | Huang et al. |
| 6,304,705 B1 | 10/2001 | Kalish et al. |
| 6,317,537 B1 * | 11/2001 | Ionov et al. .................. 385/32 |
| 6,345,141 B1 | 2/2002 | Grubb et al. |
| 6,411,762 B1 | 6/2002 | Anthon et al. |
| 6,477,307 B1 | 11/2002 | Tankala et al. |
| 6,483,973 B1 * | 11/2002 | Mazzarese et al. ......... 385/123 |
| 2002/0191928 A1 * | 12/2002 | Carter et al. |

* cited by examiner

DOUBLE-CLAD OPTICAL FIBER FOR LASERS AND AMPLIFIERS

FIELD OF THE INVENTION

This invention relates to optical fibers and, more particularly, to an optical fiber having an inner cladding for receiving pump radiation that is to be absorbed by active material in the core of the optical fiber.

BACKGROUND

Optical fiber lasers and amplifiers are known in the art. In such lasers and amplifiers, rare earth materials disposed in the core of the optical fiber laser or amplifier absorb pump radiation of a predetermined wavelength and, responsive thereto, provide or amplify light of a different wavelength for propagation in the core. For example, the well-known erbium doped fiber amplifier (EDFA) receives pump radiation having a wavelength of 980 or 1480 nanometers (nm) and amplifies an optical signal having a wavelength in the 1550 nm region and that propagates in the core.

In such optical fiber lasers and amplifiers, the pump radiation can be introduced directly to the core, which can be difficult due to the small size of the core, or can be introduced to the cladding layer surrounding the core and absorbed by the core as the rays propagating in the cladding layer intersect the core. Lasers and amplifiers with the pump radiation introduced to the cladding layer are known as "double-clad" or "cladding-pumped" optical devices, and facilitate the scale-up of lasers and amplifiers to higher power systems.

FIG. 1 illustrates an optical fiber having a core 20, an inner, or pump, multimode cladding layer 22, and an outer cladding layer 24. The inner cladding layer 22 confines light rays 26, which represent the light generated or amplified in the core 20, to the core 20. Similarly, the outer cladding 24 confines light rays 28, which represent pump radiation propagating in the inner cladding 22, to the inner cladding 22. Note that the rays 28 periodically intersect the core 20 for absorption by the active material therein so as to generate or amplify the light propagating in the core 20, represented by the rays 26. Because the inner cladding 22 is multimode, many rays other than those shown by reference numeral 28 can propagate in the inner cladding 22.

Absorption per unit length is a useful figure of merit for evaluating a double-clad optical fiber laser or amplifier. It is typically desirable that the amplifier or laser has a high absorption per unit length, indicating that the pump radiation frequently intersects the core. It has been determined by various researchers over the years that a standard circular fiber geometry, such as is desirable when fabricating an optical fiber for transmission over substantial distances, does not optimally promote intersection of the core by the radiation pumped into the cladding. Unfortunately, some rays of the pump radiation, known in the art as "skew" rays, can essentially propagate down the optical fiber while spiraling around the core without substantially intersecting the core, as shown in FIG. 1B, where pump radiation rays 28A do not intersect the core 20. The existence of skew rays leads to a low absorption per unit length of the optical fiber device, and hence detracts from the performance of the optical fiber laser or amplifier.

The prior art teaches two approaches for enhancing the intersection of the pump radiation with the core and hence raising the absorption per unit length of the optical fiber amplifier or laser. In the first approach, the core is relocated to intersect more of the rays of the pump radiation. For example, as shown in FIG. 2A and disclosed in U.S. Pat. No. 4,815,079, issued Mar. 21, 1989 to Snitzer et al., the core can be offset from the center of the optical fiber so as to enhance the intersection of pump light with the core.

In the second approach, the shape of the outer circumference of the inner, or pump, cladding layer is modified to "mode mix" or scatter more rays towards the core so as to intersect with the core. For example, as shown in FIG. 2B and also disclosed in the '079 patent to Snitzer, the inner cladding can have a rectangular outer circumference. See also FIG. 2C, where the inner cladding has a "D"-shaped outer circumference that includes a flat section, as disclosed in U.S. Pat. No. 5,864,645, issued Jan. 26, 1999 to Zellmer et al. In yet another example of this approach, the outer circumference of the cladding is shaped as a polygon, such as a hexagon, as disclosed in U.S. Pat. No. 5,533,163, issued Jul. 2, 1996 to Muendel and shown in FIG. 2D. In yet further examples, the outer circumference of the inner cladding has a "star" shape, as disclosed in U.S. Pat. No. 5,949,941, issued Sep. 7, 1999 to DiGiovanni and illustrated in FIG. 2E. See also WO 99/30391, published Jun. 17, 1999, disclosing an optical fiber having a core, inner and outer claddings, and a series of circularly shaped perturbations or irregularities formed in the otherwise circular outer boundary of the inner cladding, as shown in FIG. 2F. The optical fiber is drawn from a preform having rods inserted into holes drilled into the preform.

The prior art approaches discussed above can have disadvantages. For example, the fibers can be difficult to splice to a fiber having a standard, circular geometry in a manner that provides for an acceptably low loss of light, as is often required in a practical application. The offset core fiber of FIG. 2A can be particularly difficult to splice. Furthermore, designs shown in FIGS. 2B–2F, wherein the outer circumference of the inner cladding is shaped, can require shaping of the preform from which the fiber is drawn. Shapes that include flat areas, such as the polygon design discussed above, can be difficult and/or time consuming, and hence more expensive, to fabricate. The flat areas are typically first machined into the preform from which the optical fiber is drawn. Furthermore, shaped areas of the preform to deform and change shape when the fiber is drawn at the most desirable temperatures. Accordingly, often the draw temperature is reduced to preserve the desired shape of the outer circumference of the cladding. A reduced draw temperature typically produces optical fibers having higher attenuation and lower mechanical strength.

Accordingly, although the approaches described above may represent an improvement in the art, a double-clad fiber that addresses one or more of the foregoing disadvantages and drawbacks of the prior art approaches would be a welcome advance in the art.

SUMMARY OF THE INVENTION

In one aspect, the present invention provides a double-clad optical fiber that includes the following: a core having a first index of refraction and including an active material; a multimode inner cladding layer for receiving pump radiation, the inner cladding layer disposed about the core and including material having a second index of refraction that is less than the first index of refraction; a second cladding layer disposed about the inner cladding layer, the second cladding layer having a third index of refraction that is less than the second index of refraction. The multimode inner cladding of the double-clad fiber includes truncated regions having an index of refraction that is different than the material of the inner cladding that surrounds the truncated regions. Accordingly, the truncated regions promote the scattering of pump radiation propagating in the multimode inner cladding for increasing the absorption by the core of pump radiation.

In another aspect of the invention, the truncated regions can include filaments extending along the length of the double-clad fiber. The optical fiber can be drawn from a preform wherein the inner cladding is formed at least in part via outside vapor deposition, and wherein particles of the first material are distributed with material of the inner cladding deposited via outside vapor deposition. Alternatively or additionally, the double-clad optical fiber can be drawn from a preform formed at least in part from a frit, and wherein the first material includes material introduced at least in part by exposure of the frit to a selected solution. The truncated regions can also include voids defined by material of the inner cladding, and which may be filled with a gas.

In yet a further aspect of the invention, the truncated regions are concentrated nearer to the outer circumference of the inner cladding than to the core of the optical fiber. The truncated regions can be distributed in a band spaced from the core of the fiber by a region of the inner cladding having substantially no truncated regions. The distribution of truncated regions can include truncated regions having a maximum diameter of less than 100 microns. The active material can includes at least one of erbium, ytterbium, neodymium and thulium and other rare earth materials.

The double-clad optical fiber can include at least one bend. Bending the fiber is considered to promote mode mixing of the light in the inner cladding and hence a higher absorption of the pump radiation by the active material per unit length of the double-clad optical fiber.

The invention also includes methods practiced in accordance with the teachings herein.

In one aspect, a method of forming a cladding for being disposed about the core of an elongate optical article can include the following steps: providing a elongate glass article; adding glass to the article for forming a first part of the cladding so as to disposed about the core when present, the added glass including discrete regions having a different index of refraction than the added glass; and adding glass without discrete regions to the elongate glass article for forming another part of the same cladding so as to be disposed about the core when present.

In an additional aspect of the invention, a method of forming a cladding for being disposed about the core of an optical article can include the following steps: providing an elongate glass article; adhering a layer of soot to the elongate glass article for forming a portion of the cladding so as to be disposed about the core when present; sintering the layer of soot so as to form a first sintered layer including bubbles; adhering a different layer of soot to the elongate glass article for forming a different portion of the cladding so as to be disposed about the core when present; sintering the different layer of soot so as to form a different sintered layer substantially free from bubbles; and disposing a second cladding about the cladding, where the second cladding has an index of refraction lower than that of the cladding.

In another aspect of the invention, a method of forming a cladding for being disposed about the core of an optical article can include the following steps: providing a hollow elongate glass article; adhering a layer of soot to the elongate glass article for forming a portion of the cladding so as to be disposed about the core when present; sintering the layer of soot so as to form a sintered layer including bubbles; providing a second elongate glass article for providing one of at least a portion of the core and a different portion of the cladding where the different portion is substantially free of bubbles; and oversleeving one the glass articles with the other of the glass articles.

In a further aspect of the invention, a method of forming a cladding for surrounding the core of an optical article can include the following steps: providing a elongate glass article; adhering a layer of soot to the elongate glass article for forming a portion of the cladding so as to be disposed about the core when present; sintering said layer of soot so as to form a first sintered layer of the cladding; adhering a different layer of soot to the elongate glass article for forming a different portion of said cladding so as to be disposed about the core when present; exposing only the different layer of soot to a selected material in the form of a gas or liquid for absorption by the different layer of soot; and sintering the different layer of soot so as to form a second sintered layer of said cladding.

In yet another aspect of the invention, a method of forming a cladding for being disposed about the core of an optical article can include the following steps: providing a elongate glass article; adhering a layer of soot to the elongate glass article for forming a portion of the cladding so as to be disposed about the core when present; distributing particles having an index of refraction different than the index of refraction of the soot with the layer of soot; and sintering the soot layer.

In yet another additional aspect of the invention, a method of forming a cladding for being disposed about the core of an optical article can include the following steps: providing a hollow elongate glass article; adhering a layer of soot to the inside of the elongate glass article for forming a portion of the cladding so as to be disposed about the core when present; exposing the layer of soot to a selected material in one of a gas and liquid form for absorption by the soot; sintering the soot; providing a second glass article for providing one of at least a portion of the core and a different portion of the cladding; and oversleeving one of the glass articles with the other of the glass articles.

Thus the invention can provide a double-clad optical fiber that promotes absorption by active material in the core of pump radiation and that can retain, if desired, a circularly shaped inner cladding for improved splicing to standard optical fibers.

BRIEF DESCRIPTION OF THE DRAWINGS

The present invention may be more clearly understood from a consideration of the following Detailed Description of the Preferred Embodiments and the accompanying drawings, in which.

DETAILED DESCRIPTION OF THE PREFERRED EMBODIMENTS

Figure 1A:
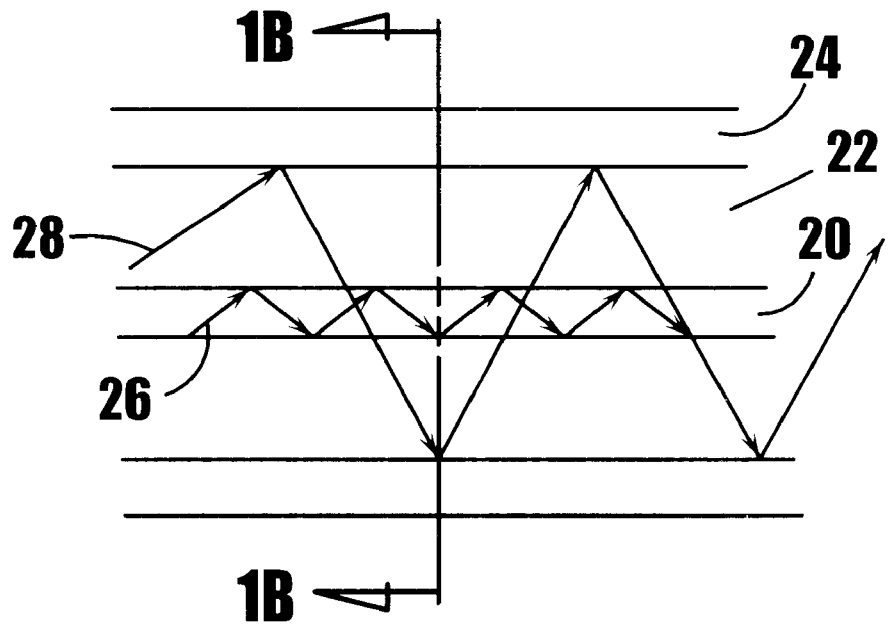
FIG. 1A is a perspective view of a double-clad optical fiber and illustrates the intersection of pump radiation propagating in the inner cladding layer of the fiber with the core of the fiber.
Figure 1B:
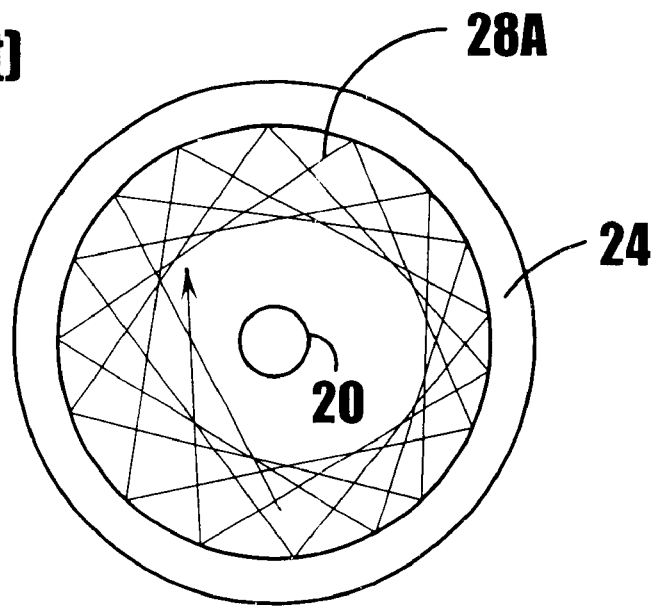
FIG. 1B is a cross section taken along section line 1B—1B of FIG. 1A and illustrates skew rays of pump radiation propagating in the inner cladding of the optical fiber and spiraling without intersecting the core of the fiber.
Figure 2A:
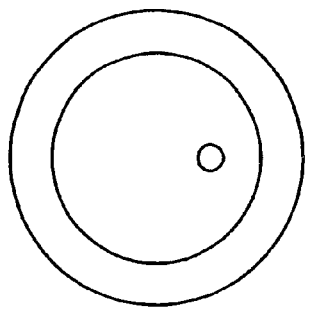
FIG. 2A is a cross section of a prior art optical fiber having an offset core.
Figure 2B:
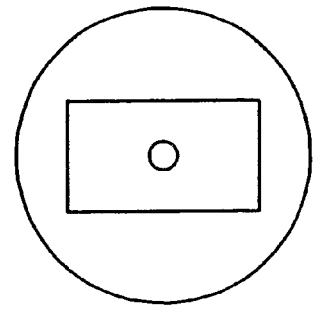
FIG. 2B is a cross section of a prior art optical fiber having a rectangular shaped inner cladding.
Figure 2C:
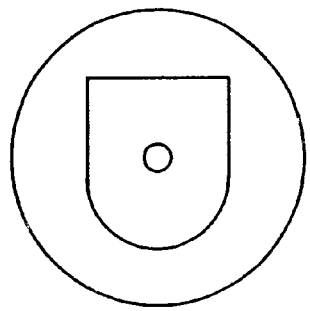
FIG. 2C is a cross section of a prior art optical fiber having a "D" shaped inner cladding.
Figure 2D:
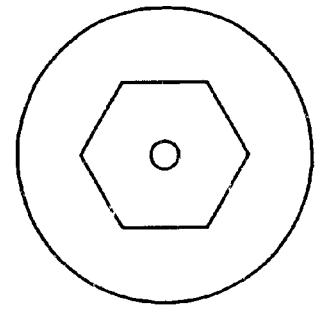
FIG. 2D is a cross section of a prior art optical fiber having a hexagonal shaped inner cladding.
Figure 2E:
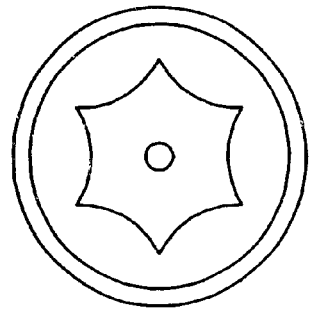
FIG. 2E is a cross section of a prior art optical fiber having a "star" shaped inner cladding.
Figure 2F:
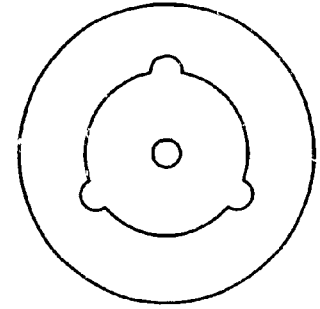
FIG. 2F is a cross section of a prior art optical fiber having an inner cladding including circularly shaped irregularities.
Figure 3:
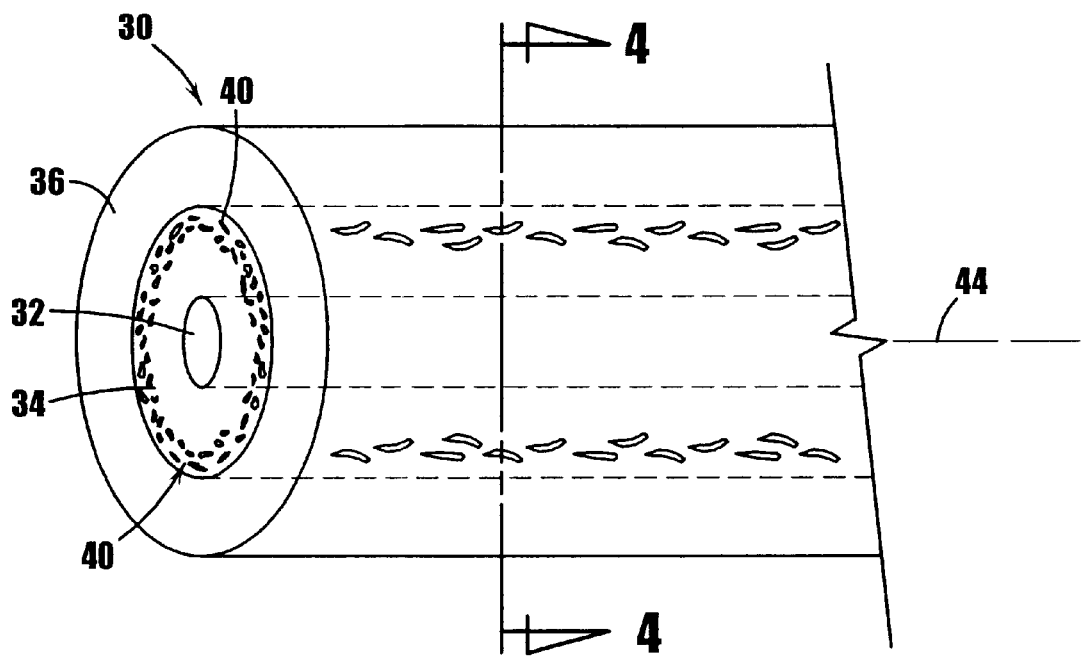
FIG. 3 is a perspective view of one embodiment of an optical fiber according to the present invention.

FIG. 3 is a perspective view of one embodiment of a double-clad optical fiber according to the present invention. The optical fiber 30 includes a core 32, a multimode cladding layer 34 disposed about the core 32, and a second cladding layer 36 disposed about the multimode cladding layer 34. The term "disposed about", as used herein, refers to one layer surrounding, at least partially, another layer, and does not require that the layers be adjacent. The multimode cladding layer 34 has a lower index of refraction than the core 32, such that the laser light to be amplified or generated in the core 32 is confined largely to the core 32 by the phenomenon of total internal reflection. Similarly, the second cladding layer 36 includes material having a lower index of refraction than the multimode cladding layer 34 such that the pump radiation is confined largely to the multimode cladding layer 34.

The double-clad optical fiber 30 can also include an additional layer or layers, such as, for example, a protective layer or layers disposed about said second cladding layer 36. For example, the additional layer(s) can include a polymer (e.g., acrylate) protective layer disposed about the second cladding layer 36. The second cladding layer 36 can be a glass or a polymer, or other material having a suitable index or refraction (i.e., lower than an index of refraction of the multimode cladding layer 34) and appropriate mechanical properties. If the second cladding layer 36 includes a polymer, use of a protective layer disposed about the second cladding layer 36 may be superfluous. Reference numeral 38 in FIG. 4, which is a cross section of the optical fiber 30 shown in FIG. 3 taken along section line 4—4, schematically illustrates one possible placement of the additional layer or layers.

With continuing reference to FIG. 3, the core 32 typically includes active material, such as one or more rare-earth dopants, which can be selected from the Lanthanide group of elements in the periodic table, in a glass matrix, which can be a silica glass matrix. Other materials, such as Ge, P, Al, B, F, etc. can also be included in the core 32 or in one or more of the other layers, such as cladding layers 34 and 36. As is known in the art, such materials are typically added dopants for any one or more of variety of reasons, such as, for example, to modify the refractive index of the core 32 or of one or more of the cladding layers, to improve the performance of the rare earth dopants in the core 32, to render the core 32 or one or more of the cladding layers sufficiently photosensitive, or to improve the radiation hardness of the core 32 or one or more of the cladding layers. As noted above, when the pump radiation intersects the core 32, the pump radiation is absorbed by the rare earth material, such as erbium, in the core 32 for amplifying or generating the laser light propagating in the core 32.

As shown in FIG. 3, the multimode inner cladding includes truncated regions 40 distributed in the inner cladding 34. The truncated regions 40 include an index of refraction that is different than at least the material of the inner cladding 34 that surrounds the truncated regions 40. The distribution of truncated regions promotes the scattering of pump radiation propagating in the inner cladding 34 for increasing the absorption by the core 32 of the pump radiation. The efficiency of the double-clad optical fiber 30 is thereby enhanced.

The term "truncated regions" is selected in part to distinguish references herein to the regions 40 formed in the inner cladding 34 of the optical fiber 30 and shown in FIG. 3 from particles 40A and discrete regions that can be included in a preform, as discussed below, and which will contribute to the truncated regions 40 when the preform is drawn to provide an optical fiber. The terms "discrete" and "truncated" do indicate that discrete regions and truncated regions 40 are of limited extent in all directions, including the longitudinal direction 44 and do not extend for the full length of the core 32 of a preform or fiber. One of ordinary skill readily understands that a preform, as a fiber, can have a core and a cladding, and the core and the cladding substantially retain their relative diameters upon drawing of a fiber from the preform.

In one practice of the invention, the truncated regions 40 can have substantially the same coefficient of thermal expansion as at least the material of the inner cladding 34 that surrounds the truncated regions 40, such that the truncated regions 40 do not induce stress in the inner cladding 34.

Figure 4:
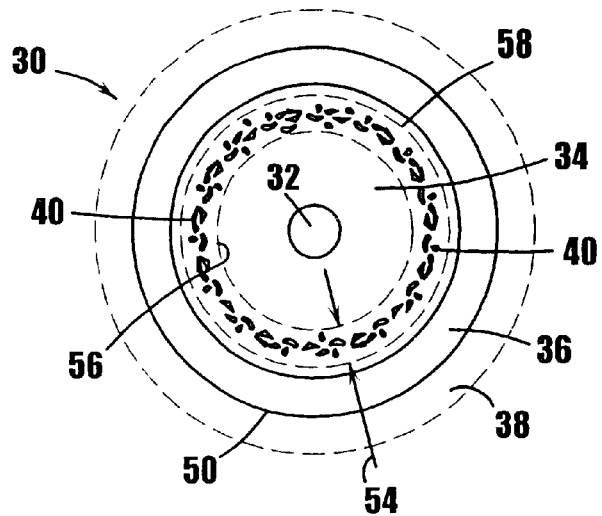
FIG. 4 is a cross section of the optical fiber shown in FIG. 3, taken along section line 4—4 of FIG. 3.

With reference again to FIG. 4, the truncated regions 40 are preferably concentrated nearer to the outer circumference 50 of the inner cladding 34 than to the core 32 of the optical fiber 30. For example, as shown in FIG. 4, the truncated regions 40 can be concentrated in a band 54 having an inner circumference 56 and an outer circumference 58. The outer circumference 58 of the band 54 can be adjacent the outer circumference 50 of the inner cladding 34, and in one embodiment of the invention the truncated regions 40 are distributed up to the outer circumference 50 of the inner cladding 34, such that the outer circumference 50 of the inner cladding 34 and the outer circumference 58 of the band 54 are substantially coextensive. Preferably, the truncated regions 40 are uniformly distributed within the band 54. As can be seen in FIG. 4, preferably the truncated regions are concentrated in the band 54 spaced from the core 32 by a region of the inner cladding 34 having a substantially no truncated regions 40. The truncated regions 40 can also be distributed in band that is spaced from the core 32 and the outside circumference 50 of the inner cladding 34 by regions of the inner cladding 34 having substantially no truncated regions 40.

Figure 5A:
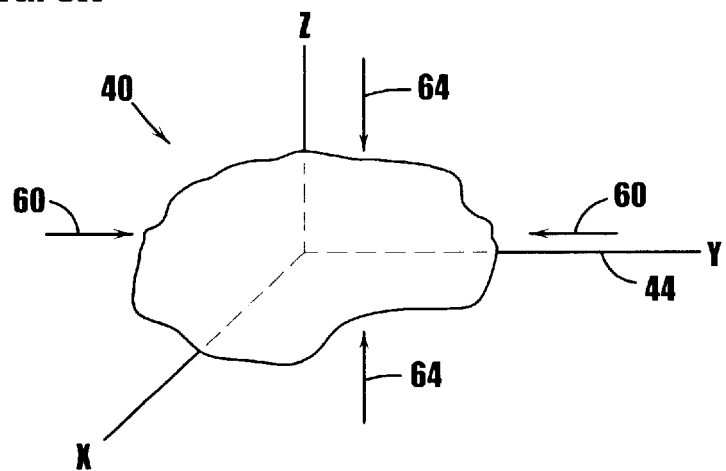
FIG. 5A illustrates one example of a truncated region that can be included in the inner cladding of an optical fiber of the present invention.

FIG. 5A illustrates a typical truncated region 40. The truncated regions 40 need not be spherical, and can be irregularly shaped, having a maximum diameter 60 and a minimum diameter 64. Because, as indicated below, the truncated regions 40 will typically be shaped during the drawing of a preform that includes particles or discrete regions, the truncated regions 40 typically have a maximum diameter 60 along the longitudinal axis 44 of the optical fiber 30.

As understood by those of ordinary skill in the art, the optical fiber 30 is typically drawn from a preform. Such a preform can be can be made using methods such as vapor phase axial deposition (VAD), outside vapor deposition (OVD), modified chemical vapor deposition (MCVD), or inside vapor deposition (IVD), as well as other methods known to those of ordinary skill in the art. IVD refers to the process wherein soot formed by flame hydrolysis flows through the inside of a tube.

Figure 6:
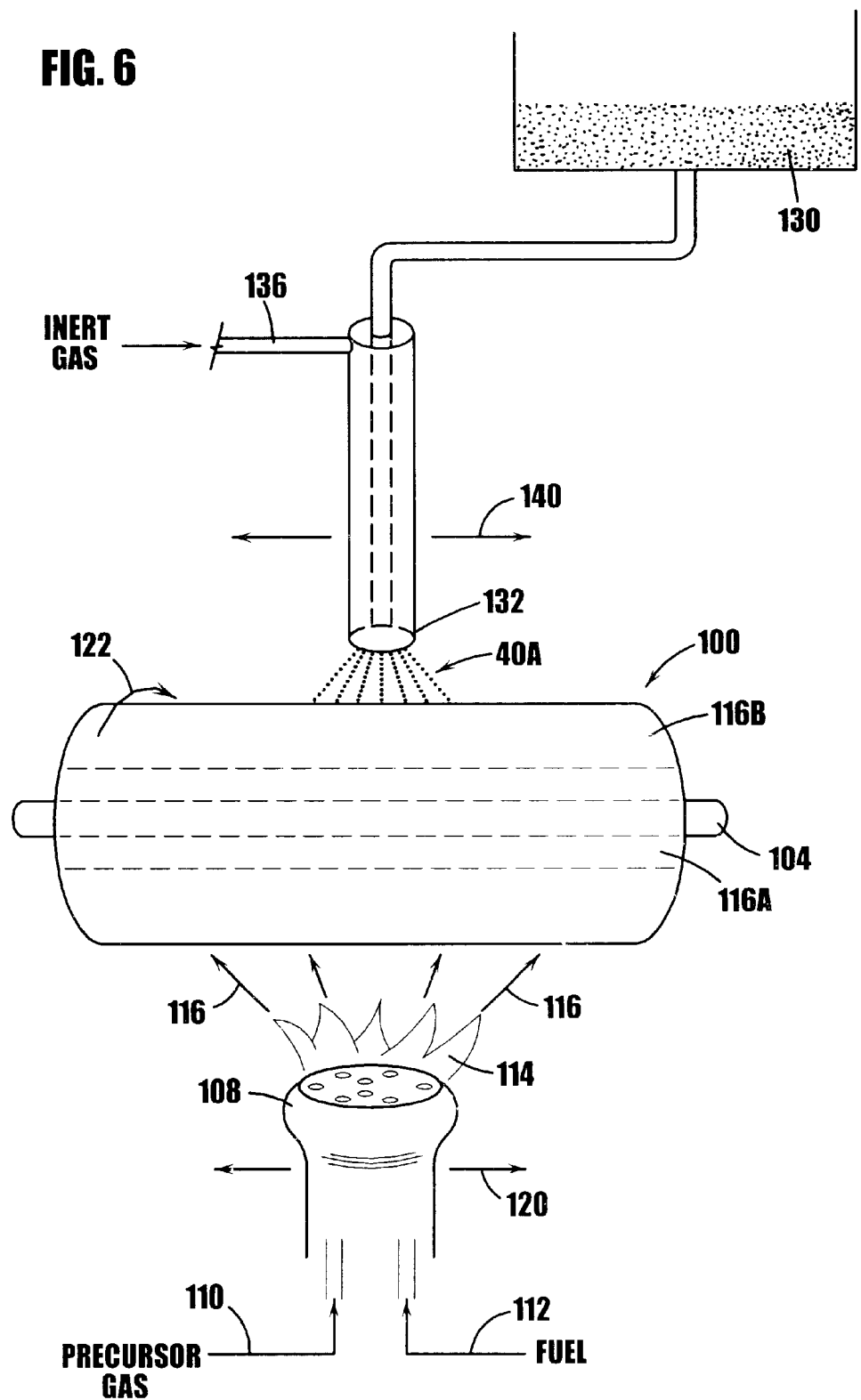
FIG. 6 illustrates one technique for distributing particles in a preform for forming truncated regions in an optical fiber drawn from the preform.

FIG. 6 illustrates one technique for distributing particles in a preform for forming truncated regions in an optical fiber drawn from the preform. The preform 100 can include, or be formed about and then removed from, a center portion 104, which can be an elongate glass article such as a rod or tube. The center portion 104 can be a tube that has had layers and/or dopants added to the tube via another type of deposition processes, such as solution doping or MCVD. Tube and rods having selected glass compositions and suitable for use in preforms are available from vendors such as Heraeus Amersil of Duluth, Ga., USA.

The torch 108 receives a precursor gas 110 and a fuel 112 for producing the flame 114 and accompanying soot 116 that then adheres to the preform center portion 104. The torch 108 translates back and forth, as indicated by reference numeral 120, as the preform 100 rotates, as indicated by reference numeral 122, for promoting uniform deposition of the soot 116 (also known as a frit), which is typically adhered to the center portion 104 in layers. Control of the type and amount of the precursor gas 110 can allow variation of the type and amount of soot deposited on the center portion 104. In one practice of the invention, soot can be deposited so as to form an inner soot region 116A and an outer soot region 116B. In one practice, the inner soot region 116A forms, after sintering and drawing of the preform, the inner cladding 34 of the fiber 30, and the outer soot region 116B similarly forms the second cladding layer 36.

The reservoir 130 includes particles 40A, which can be particles of glass having a selected index of refraction and size, and which can be distributed in the frit 116 via the nozzle 132. The nozzle 132 can also be fed an inert gas 136 for aiding in dispensation of the particles 40A from the nozzle 132, and is typically translated back and forth, as indicated by reference numeral 140. Proper control of the dispensation of the particles 40A and soot 116 can provide the desired distribution of the particles at the desired radius or radii. For example, the particles can be distributed so as to be concentrated in an outer region 116B, which can correspond, upon drawing of the fiber 30, to the band 54 of truncated regions 40 shown in FIG. 4. At least part of the inner soot region 116A can correspond to region of the inner cladding 30 between the band 54 and the core 32 having substantially no truncated regions 40. The inner region 116A can also include soot deposited to contribute to the core 32.

When drawing the optical fiber 30 from a preform, a furnace, such as a high frequency induction furnace or a resistance furnace, can heat one end of the preform, and a spool can pull the optical fiber from the heated end of the preform. The optical fiber is typical drawn from the preform using a draw tower. Typically mounted with the draw tower are the following: a diameter-measuring element for monitoring the diameter of the drawn optical fiber; a coating apparatus that includes a die through which the drawn optical fiber passes for applying a protective layer or other layer(s) to the drawn optical fiber; and an ultraviolet (uv) lamp for curing the coating material before the optical fiber is wound on the spool. The foregoing description of a drawing apparatus is exemplary and is provided for background; the drawing process is well understood by one of ordinary skill in the art, and the term "drawing", as used herein, refers to heating glass and forming a strand of fiber from the glass, regardless of the exact apparatus used to draw the fiber.

Figure 5B:
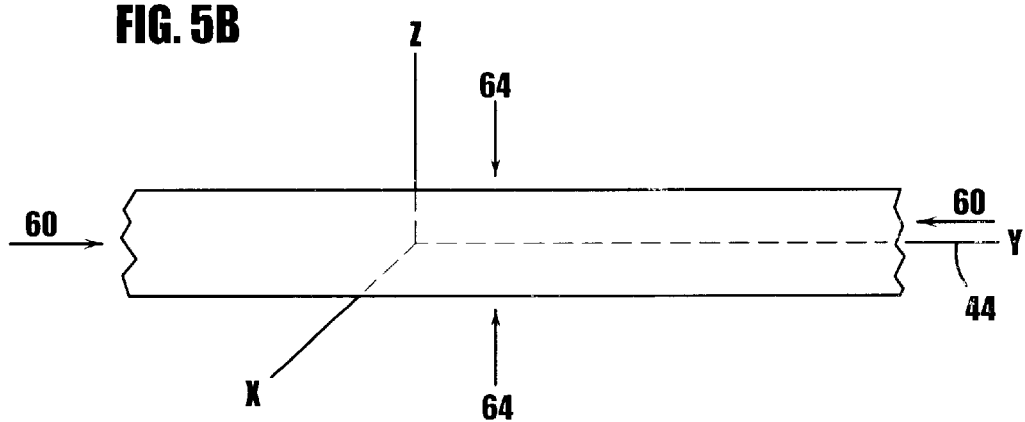
FIG. 5B illustrates another example of a truncated region that can be included in the inner cladding of an optical fiber of the present invention.

Typically, the host glass of the fiber 30 (and hence of the preform 100) is silica glass, which softens for drawing at a higher temperature than many of the materials that can be used for the particles and truncated regions. Accordingly, in many instances the particles 40A will also soften and be drawn so as to elongate considerably. In such circumstances the truncated regions 40 will include tubes or filaments, as show in FIG. 5B, and can extend along the length of the fiber for distances on the order of centimeters, such as, for example, 10 cm.

The truncated regions 40 can in general include, but are not limited to, materials such as ceramics, which can include glasses, as well as metals, non-metals, such as plastics, rare earth materials, and materials typically used as dopants in glass for optical fibers. More specifically, and again without limitation, the truncated regions 40 can include silica, alumina, silicon carbide, lanthanum, as well as germanium, fluorine, boron, and phosphorous. The truncated regions 40 can also include voids that can be empty or filled with a gas, such as air. The particles 40A can be produced from a piece of one or more of the foregoing materials, such as a piece of doped glass, having the desired properties and that is then ground, pulverized, machined, etched or otherwise acted upon to produced particles 40A. The resultant particles can be sorted, if desired, to provide particles 40A that are no larger or smaller than a specified size.

Figure 7A:
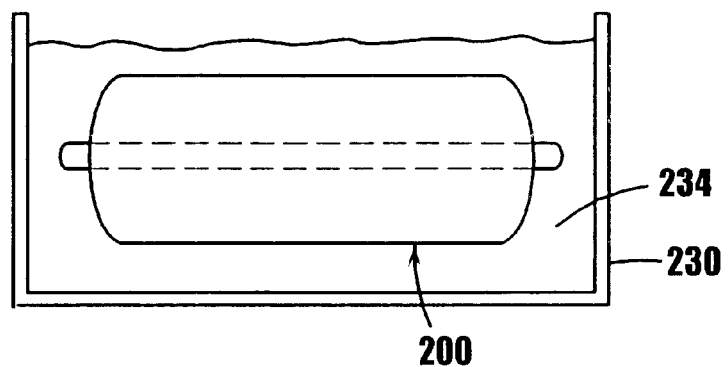
FIG. 7A illustrates exposing soot to a selected solution.

The truncated regions can include material added to a preform by exposing the soot 116 or selected portions thereof, to a selected materials that are in a liquid or gas form. For example, the soot or frit 116 shown in FIG. 6 can be exposed to a selected solution, such as, for example, by placing the frit 116 in a container 230 that confines the selected solution 234, as shown in FIG. 7A. The frit 116 absorbs the selected solution 234. In one practice of the invention, the selected solution 234 can include phosphoric acid, which includes phosphorous pentoxide and water. Subsequent heating of the frit 116 drives off the water so as to form phosphorous pentoxide. The phosphorous pentoxide devitrifies, or phase separates, so as to have a different phase than the surrounding glass. The resultant drawn optical fiber 30 includes truncated regions 40 including the phase-separated material. The truncated regions 40 of the inner cladding 34 have a different index of refraction than the surrounding glass of the inner cladding 34 and scatter pump radiation for increasing the absorption of the pump radiation by the active material in the core of the fiber.

Sintering a portion of the frit 116 to form glass prior to exposing the frit 116 to the selected solution 234 reduces any exposure of the sintered portion of the frit 116 to the selected material. Alternatively or additionally, soot can be added to the frit 116 after a selected portion is exposed. It is thus possible to control in this manner the parts of the inner cladding 34 that include truncated regions 40. For example, in one practice of the invention, the inner soot, or frit, region 116A of FIG. 6 can be first adhered and sintered prior to adhering the second soot region 116B to the center portion 104. Placing the frit in an oven is one technique for sintering the first soot region 116A. The second frit region 116B can be exposed and processed as described to create regions of the selected material of a different phase. Thus the inner soot region 116A can contribute to an inner portion of the of the inner cladding 34 that includes substantially no truncated regions 40, and the outer soot regions 116B can contribute to a part, such as the band 54 of FIG. 4, of the inner cladding 34 that includes truncated regions 40. With reference to FIG. 6, the inner frit 116A can also include soot deposited to contribute to the core 32.

Additional soot can then adhered to the preform, such as by being deposited over the exposed portion of the frit prior to or after sintering, to further form the inner cladding layer 34 or to form additional cladding layers, such as the second cladding layer 36.

Figure 7B:
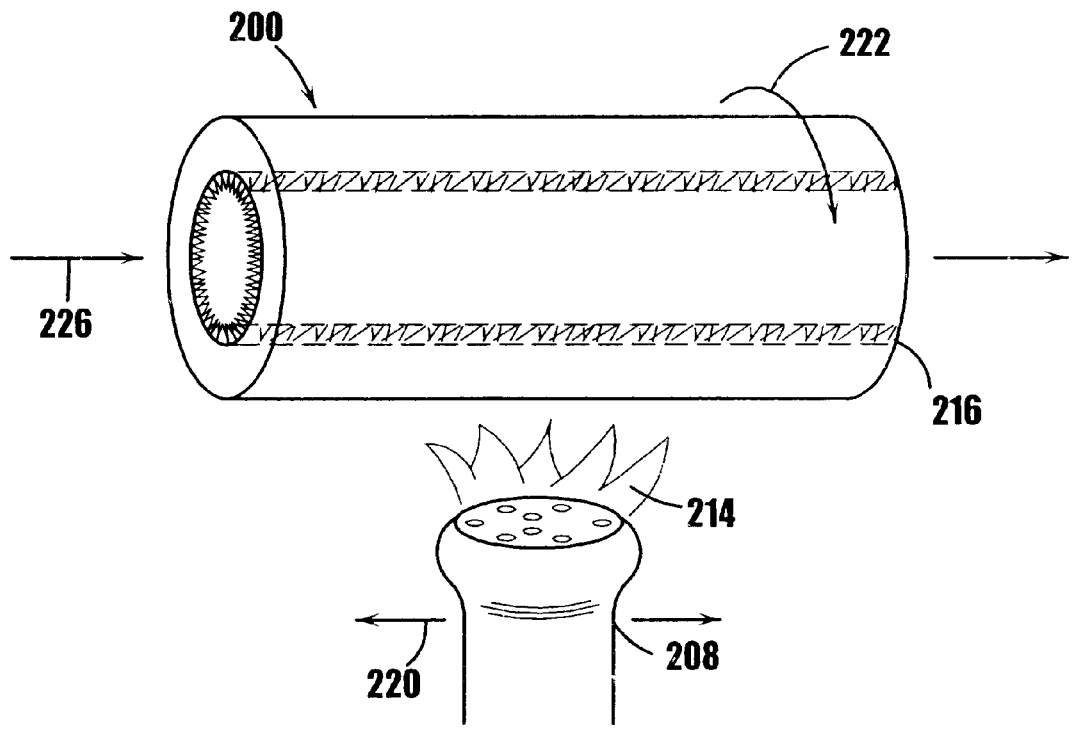
FIG. 7B illustrates depositing soot on the inside of a glass tube.

A frit can be formed using the MCVD or IVD processes as well as the OVD process. With reference to FIG. 7B, a frit can be formed via MCVD or IVD on the inside of a hollow elongate glass article, such as the tube 200, as part of the process of making a preform. As shown in FIG. 7A, the torch 208 produces the flame 214 for heating the tube 200 and causing the frit 216 to deposit on the inside of the tube 200. The torch translates, as indicated by reference numeral 220, as the tube 200 rotates, as indicated by reference numeral 222. A precursor gas having the desired composition passes through the center of the tube 200, as indicated by reference numeral 226, for forming the frit 216 on the inside of the tube 200.

As understood by one or ordinary skill in the art, in some processes, such as MCVD, soot formation and sintering of the soot can take place in one operation. For example, assume that the torch in FIG. 7B moves in the direction gas flow 226 and starts at the left hand side of the tube 200 shown in FIG. 7B. As the gas flows past area heated by the torch 208, soot is formed and adheres to the tube 200 in a zone to the right of the torch 208. The torch 208 then passes over the portion of the tube 200 where the soot has been deposited. If the temperature of the torch 208 is hot enough, the soot is then sintered to form glass. However, according to the invention, it can be desirable that the soot not be sintered, such that the soot can be exposed to the selected material, such as the selected solution 234. In this instance the temperature of the torch 208 can be reduced such that the soot is not sintered. The soot can later be appropriately sintered using the torch 208 or by otherwise heating the soot, such as by placing the tube 200 in an oven Accordingly, the preceding discussion in conjunction with FIG. 6 regarding sintering a portion of the frit 116 prior to exposure of another portion can apply to deposition of the frit 216 of FIG. 7B. The portion of the frit 216 to be exposed can be immersed in the solution 234, as shown in FIG. 7A. The tube 200 including the exposed frit can then be used to oversleeve a suitable rod or another tube, or may be collapsed, such as after the deposition of additional soot, or may be oversleeved by another tube having a suitable inside diameter, to complete a preform for drawing the optical fiber 30 in accordance with the present invention. Oversleeving refers to the joining of two elongate glass articles, such as a rod and a tube, wherein one of the articles is disposed about the other of the articles. Oversleeving can be done on a lathe, wherein for, example, a tube can be disposed about a rod or another tube of a smaller diameter and then collapsed via the application of heat, such as by using a torch. Glass articles can also be oversleeved during draw by, for example, disposing a tube about a rod on the draw tower and drawing both together. The rod can provide the core 32 and inner cladding 34 of the optical fiber 30 and the tube can provide the second cladding 36.

The frit 116 or 216 can be exposed to the selected material in form of a gas, such as, for example, by maintaining a flow of POCl down the inside of the tube 200 for exposing the frit 216 to the POCl, or exposing the frit 116 to POCl gas.

Although the foregoing discussion has described the use of phosphoric acid, one of ordinary skill, apprised of the disclosure herein, will ascertain that the frit 116, 216 can be exposed to other material to be included in the truncated regions 40. One factor in inducing subsequent phase separation in certain materials is the concentration of the selected material to which the frit is exposed. The phase separation can involve forming crystalline regions.

For example, rare earth materials having acceptable absorption (preferably as low as possible) at the wavelength of operation of the double-clad fiber laser or amplifier may also be suitable. As one example, the selected solution 234 can include a sufficiently high concentration of lanthanum, such that at least some of the lanthanum becomes phase separated in the host glass matrix, forming truncated regions 40 in the drawn fiber for scattering pump radiation. Absorption by the lanthanum of the pump radiation can be minimal, such that it primarily acts to scatter the pump radiation for increased intersection with the core 32 of the optical fiber 30.

Truncated regions 40 including voids can be included in an optical fiber 30 according to the invention. For example, a selected portion of the frit 116 or 216 can be imperfectly sintered, such as by reducing the sintering temperature, so as to allow voids, or bubbles, to remain in the sintered soot. Other portions of the frit being can be sintered so as to preclude the formation of voids. Upon drawing of the fiber, the inner cladding 34 can define elongated truncated regions 40 including voids in the form of tubes or filaments.

For example, in one practice of the invention, a layer of soot is adhered to an elongate glass article, which can be, for example, a rod or a tube, for forming a portion of the inner cladding so as to be disposed about the core. In the case of a tube, the soot may be adhered to either the inside or on the outside of the tube. The core material may or may not yet be included with the elongate glass article. In either case, the soot can be adhered such that when the core material is present, the soot will form part of the cladding that surrounds the core. The layer of soot is sintered so as to form a first sintered layer including bubbles. Normally, bubbles are a defect formed when the sintering temperature is too low and/or the flow rate of precursor gas is too high. According to the invention, however, bubbles are deliberately formed. A different layer of soot is adhered to the glass article, such as over the sintered layer of soot that includes the bubbles or onto another surface of the elongate glass article, and is sintered so as to be substantially free from bubbles. The different layer of soot can form a different part of the inner cladding, part of the second cladding, or can form part of the core, and can be adhered to the elongate glass article prior to adhering the layer of soot that includes the bubbles. A second cladding is disposed about the inner cladding, where the second cladding has an index of refraction that is lower that the index of refraction of the inner cladding. The second cladding can be provided by oversleeving the elongate glass article with a tube, depositing additional soot, or by applying a suitable coating after drawing.

In another practice of the invention, a layer of soot is adhered to a hollow glass article for forming a portion of the cladding so as to be disposed about the core when present, and the layer of soot is sintered so as to form a sintered layer including bubbles. The glass article is used to oversleeve a second elongate glass article, or the second glass article is used to oversleeve the glass article. The second glass article provides at least a portion of the core or a different portion of the cladding, where the different portion is substantially free of bubbles.

More than one type of deposition process can be used in preparing a preform. For example, a layer of soot can be adhered to the outside of a hollow glass tube using OVD for forming a part of the inner cladding. Particles may be added to the layer of soot, the soot layer sintered to include glass bubbles, or the layer exposed to the selected material. The index of refraction of the tube can be selected such that upon draw the tube forms another part of the inner cladding. Soot can be adhered to the inside of the tube for forming the inner cladding and/or for forming the core. The glass article is collapsed and drawn. The second cladding of the resultant fiber 30 can include a polymer coating or a glass tube oversleeved over the glass article and drawn therewith.

Thus, according to the invention, there can be provided an improved double-clad optical fiber. Prior art double-clad fibers, as discussed in the Background section above, are typically drawn at temperatures substantially lower than those used when drawing standard round fiber. These reduced temperatures can be required to preserve the desired shape of the outer circumference of the cladding layer of the resultant drawn fiber. In practicing the present invention, a higher draw temperature can be used, if desired, as the outer circumference can be substantially circular, which shape is naturally assumed given viscous nature and surface tension of the molten glass when drawn. The use of a higher draw temperature can also aid in achieving better fiber strength and lower attenuation.

Furthermore, in one practice of the invention, fabrication of a preform for drawing an optical fiber according to the invention need not include expensive and/or laborious and time consuming machining or drilling of the preform, or the machining or other fabrication of accessories such as rods for insertion in holes drilled in a preform. The outer circumference of the inner cladding can be substantially circular, which facilitates cleaving of the fiber and splicing of the optical fiber to other fibers. Of course, one of ordinary skill in the art, in light of the disclosure herein, may elect to include shaping or drilling the preform along with inclusion of the truncated regions described above and remain within the scope of the invention.

It will thus be seen that the invention efficiently achieves the objects set forth above, as well as those apparent from the foregoing disclosure. It is intended that all matter included in the above disclosure be interpreted as illustrative and not in a limiting sense, as one of ordinary skill in the art, apprised of the disclosure herein, can make certain changes in the above constructions without departing from the scope of the invention.

Accordingly, it is understood that the following claims are intended to cover generic and specific features of the invention described herein, and all statements of the scope of the invention, which as a matter of language might be said to fall therebetween.

Having described the invention, what is claimed as new and to be secured by Letters Patent is:

1. A double-clad optical fiber, comprising:

a core including a first index of refraction and including an active material;

a multimode inner cladding for receiving pump radiation, said inner cladding disposed about said core and having a second index of refraction that is less than said first index of refraction;

a second cladding disposed about said inner cladding, said second cladding having a third index of refraction that is less than said second index of refraction; and wherein said multimode inner cladding includes truncated regions having an index of refraction that is different than the index of refraction of material of the inner cladding that surrounds said truncated regions, whereby said truncated regions promote the scattering of pump radiation propagating in said multimode inner cladding for increasing the absorption by said core of pump radiation.

2. The double-clad optical fiber of claim 1 wherein said truncated regions include filaments extending along the length of the double-clad fiber.

3. The double-clad optical fiber of claim 1 wherein said optical fiber is drawn from a preform wherein said inner cladding is formed at least in part via outside vapor deposition, and wherein particles are distributed with material of said inner cladding deposited via outside vapor deposition, said particles for forming said truncated regions.

4. The double-clad optical fiber of claim 1 wherein said optical fiber is drawn from a preform formed at least in part from a frit, and wherein said frit is exposed to a solution for providing at least part of said truncated regions.

5. The double-clad optical fiber of claim 1 wherein said truncated regions are concentrated nearer to the outer circumference of said inner cladding than to said core of the optical fiber.

6. The double-clad optical fiber of claim 1 wherein said truncated regions are distributed in a band spaced from said core of said fiber by a region of said inner cladding having substantially no truncated regions.

7. The double-clad optical fiber of claim 1 wherein said second cladding layer includes a polymer.

8. The double-clad optical fiber of claim 1 wherein said second cladding layer includes a glass.

9. The double-clad optical fiber of claim 1 wherein said truncated regions include truncated regions having a maximum diameter of less than 100 microns.

10. The double-clad optical fiber of claim 1 wherein said active material includes at least one of erbium, ytterbium, neodymium and thulium.

11. The double-clad optical fiber of claim 1 wherein said truncated regions include voids defined by material of said inner cladding.

* * * * *

UNITED STATES PATENT AND TRADEMARK OFFICE
CERTIFICATE OF CORRECTION

PATENT NO. : 6,687,445 B2
DATED : February 3, 2004
INVENTOR(S) : Carter et al.

It is certified that error appears in the above-identified patent and that said Letters Patent is hereby corrected as shown below:

<u>Title page,</u>
Item [57], ABSTRACT,
Line 9, please replace "said" with -- the --;
Line 14, please replace "the" with -- a --.

<u>Drawings,</u>
Sheet 3, Figure 4, please extend the lead line for reference numeral 50 from the outer circumference of the second cladding to the outer circumference of the inner cladding.

<u>Column 2,</u>
Line 42, please replace "preform to deform" with -- preform tend to deform --;

<u>Column 3,</u>
Line 11, please replace "of the" with -- of a --;
Line 28, please replace "includes" with -- include --;
Line 39, please replace "a" with -- an --;
Line 41, please replace "to disposed" with -- to be disposed --;
Line 55, please replace "so to" with -- so as to --.

<u>Column 4,</u>
Line 5, please replace "one the" with -- one of the --;
Lines 9 and 23, please replace "a" with -- an --.

<u>Column 6,</u>
Line 1, please replace "added" with -- added as --;
Line 2, please replace "of variety" with -- of a variety --;
Line 59, please delete "a";
Line 61, please replace "in band" with -- in a band --.

<u>Column 7,</u>
Line 65, please replace "typical" with -- typically --.

<u>Column 8,</u>
Line 42, please replace "to a selected" with -- to selected --.

UNITED STATES PATENT AND TRADEMARK OFFICE
CERTIFICATE OF CORRECTION

PATENT NO.    : 6,687,445 B2
DATED         : February 3, 2004
INVENTOR(S)   : Carter et al.

It is certified that error appears in the above-identified patent and that said Letters Patent is hereby corrected as shown below:

Column 9,
Line 7, please delete "of the" (second occurrence);
Line 37, please replace "past area" with -- past the area --.

Signed and Sealed this

Fourth Day of May, 2004

JON W. DUDAS
*Acting Director of the United States Patent and Trademark Office*